US012759393B1

(12) United States Patent
Singh et al.

(10) Patent No.: US 12,759,393 B1
(45) Date of Patent: Oct. 13, 2026

(54) TWO SPEED GEAR REDUCER WITH POWER TAKE OFF FOR ELECTRIC DRIVE MODULE

(71) Applicant: FCA US LLC, Auburn Hills, MI (US)

(72) Inventors: Tejinder Singh, Auburn Hills, MI (US); Neil Jackson, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 19/237,206

(22) Filed: Jun. 13, 2025

(51) Int. Cl.
*B60K 17/28* (2006.01)
*B60K 1/00* (2006.01)
*B60K 17/08* (2006.01)

(52) U.S. Cl.
CPC ................ *B60K 17/28* (2013.01); *B60K 1/00* (2013.01); *B60K 17/08* (2013.01)

(58) Field of Classification Search
CPC .......... B60K 17/28; B60K 1/00; B60K 17/08; F16H 3/54; F16H 3/56; F16H 37/0833; F16H 3/64
USPC ............................ 180/53.1; 475/5, 275, 276
See application file for complete search history.

(56) References Cited

U.S. PATENT DOCUMENTS 4,667,783 A * 5/1987 Sugano ............... F16H 63/3416 192/219.5
5,122,099 A * 6/1992 Boedo ..................... F16H 15/56 475/187
5,328,419 A * 7/1994 Motl ......................... F16H 3/56 475/338
7,448,460 B2 * 11/2008 Morrow ................... B60K 6/46 180/53.61
9,242,555 B2 * 1/2016 Wenthen ................... F16H 3/64
9,841,092 B2 * 12/2017 Wenthen ............. F16H 37/0833
2009/0247346 A1 * 10/2009 Hvolka ..................... F16H 3/54 475/155
2010/0267508 A1 * 10/2010 Hvolka ..................... F16H 3/78 475/149
2011/0218070 A1 * 9/2011 Mack ....................... B60K 1/00 475/150

* cited by examiner

*Primary Examiner* — Jason D Shanske
*Assistant Examiner* — Caitlin Anne Miller
(74) *Attorney, Agent, or Firm* — Jeremy J. Klobucar

(57) ABSTRACT

An electric drive module (EDM) for an electrified vehicle is provided. The EDM includes a housing; an electric motor; a single compound planetary gear set having a sun gear fixed to its input shaft, a single planetary carrier rotationally supporting pairs of compound planets in engagement with the sun gear and a ring gear, respectively; first and second torque transfer devices (TTDs) coupled to the carrier; and a power take off (PTO). The EDM is selectively switchable among: (i) a first gear where the first TTD is disengaged and the second TTD is engaged grounding the carrier to the housing, (ii) a second gear where the second TTD is disengaged and the first TTD is engaged to couple for common rotation the carrier and the sun gear; and (iii) a neutral PTO mode where the input shaft drives the PTO.

20 Claims, 2 Drawing Sheets

TWO SPEED GEAR REDUCER WITH POWER TAKE OFF FOR ELECTRIC DRIVE MODULE

FIELD

The present application generally relates to electric drive modules for electric vehicles and, more particularly, to a two-speed gear reducer with power take off for an electric drive module for an electrified vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric vehicles typically have single speed gearboxes, which while providing great torque capability on the road, are unable to provide sustained high torque for trail and sand driving or various other speeds. Such gearboxes may provide sustained high torque through higher ratio gearing, but this may not be ideal for meeting range and performance requirements for on-road and off-road usage. Moreover, such gearboxes often have relatively complex gearing arrangements and increased packaging constraints. Accordingly, while such conventional gearing systems do work for their intended purpose, there exists an opportunity for improvement in the relevant art.

SUMMARY

According to one example aspect of the invention, an electric drive module (EDM) is provided for an electrified vehicle and includes a housing, an electric motor and a two-speed gearbox. In one exemplary implementation, the two-speed gearbox assembly incudes: one compound planetary gear set having a sun gear, a ring gear and a single planetary carrier with compound planetary gears each including a first gear in meshing engagement with the sun gear and a second gear in meshing engagement with the ring gear; an input shaft connected to the sun gear and coupled to an output of the electric motor; a first torque transfer device configured to be controlled to selectively couple the carrier to the input shaft; a second torque transfer device configured for selectively coupling the carrier to the housing; wherein the ring gear is connected to an output of the two-speed gearbox assembly, which is coupled to a final drive of the electrified vehicle; and wherein the EDM is selectively switchable among: (i) a first gear where the first torque transfer device is disengaged and the second torque transfer device is engaged grounding the carrier to the housing; and (ii) a second gear where the second torque transfer device is disengaged and the first torque transfer device is engaged to couple for common rotation the carrier and the sun gear.

According to one example aspect of the invention, an electrified vehicle having an electric drive module (EDM) is provided. In one exemplary implementation, the EDM incudes a housing, an electric motor and a two-speed gearbox assembly. The two-speed gearbox assembly includes: one compound planetary gear set having a sun gear, a ring gear and a single planetary carrier with compound planetary gears each including a first gear in meshing engagement with the sun gear and a second gear in meshing engagement with the ring gear; an input shaft connected to the sun gear and coupled to an output of the electric motor; a first torque transfer device configured to be controlled to selectively couple the carrier to the input shaft; a power take off (PTO) driven by the input shaft; a second torque transfer configured for selectively coupling the carrier to the housing; wherein the ring gear is connected to an output of the two-speed gearbox assembly, which is coupled to a final drive of the electrified vehicle; and wherein the EDM is selectively switchable among: (i) a first gear where the first torque transfer device is disengaged and the second torque transfer device is engaged grounding the carrier to the housing; (ii) a second gear where the second torque transfer device is disengaged and the first torque transfer device is engaged to couple for common rotation the carrier and the sun gear; and (iii) a neutral PTO mode wherein the first and second torque transfer devices are disengaged and the input shaft drives the PTO.

In some implementations, first gear comprises a torque multiplication greater than one, and second gear comprises a torque multiplication equal to one.

In some implementations, the EDM further comprises first and second fixed gear reduction gearsets, where the first gear reduction gearset couples the electric motor to the input shaft, and where the second gear reduction gearset couples the output of the two-speed gearbox to a differential of the electrified vehicle.

In some implementations, the first gear reduction gearset comprises first and second gears in meshing engagement, and the sun gear is fixed for common rotation with the input shaft and the second gear of the first reduction gearset.

In some implementations, the electric motor output is fixed for common rotation with the first gear of the first reduction gearset.

In some implementations, the EDM further comprises a park lock gear coupled to the output of the two-speed gearbox assembly upstream of the second fixed gear reduction set.

In some implementations, the two-speed gearbox assembly is selectively switchable to a neutral state by controlling the first and second torque transfer devices to be disengaged or open.

In some implementations, the first torque transfer device comprises a clutch and the second torque transfer device comprises a brake.

In some implementations, the first and second torque transfer devices comprise dog clutches.

In some implementations, the two-speed gearbox assembly comprises only the one compound planetary gearset and only the two torque transfer devices. In some implementations, the EDM comprises only one electric motor.

In some implementations, the input shaft and the output of the two-speed gearbox are concentric. In some implementations, an inner end of the input shaft is rotatable supported by an adjacent inner end of the output.

Further areas of applicability of the teachings of the present application will become apparent from the detailed description, claims and the drawings provided hereinafter, wherein like reference numerals refer to like features throughout the several views of the drawings. The claims form an integral part of the disclosure. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

The present disclosure will become more fully understood from the detailed description and the accompanying drawings, given purely by way of non-limiting example, wherein.

DESCRIPTION

As previously discussed, an electrified vehicle that utilizes a single speed gearbox in or associated with an electric drive module (EDM) can include drawbacks such as reduced efficiency, and an inability to meet desired gradeability requirements and/or desired vehicle top speed requirements. Accordingly, an improved EDM for an electrified vehicle is provided. In one example, such an improved EDM includes a two-speed gearbox. In one example, this two-speed gearbox includes a single planetary gearset, and two torque transfer devices. In one example implementation, the single planetary gearset is the only planetary gearset and is a compound planetary gearset. In one example, there are three stages of gear reduction providing for the use of only one electric motor. These features alone or in combination provide for a more efficient gearbox with improved NVH that can switch between the two gears all while being less complex and more compact.

Figure 1:
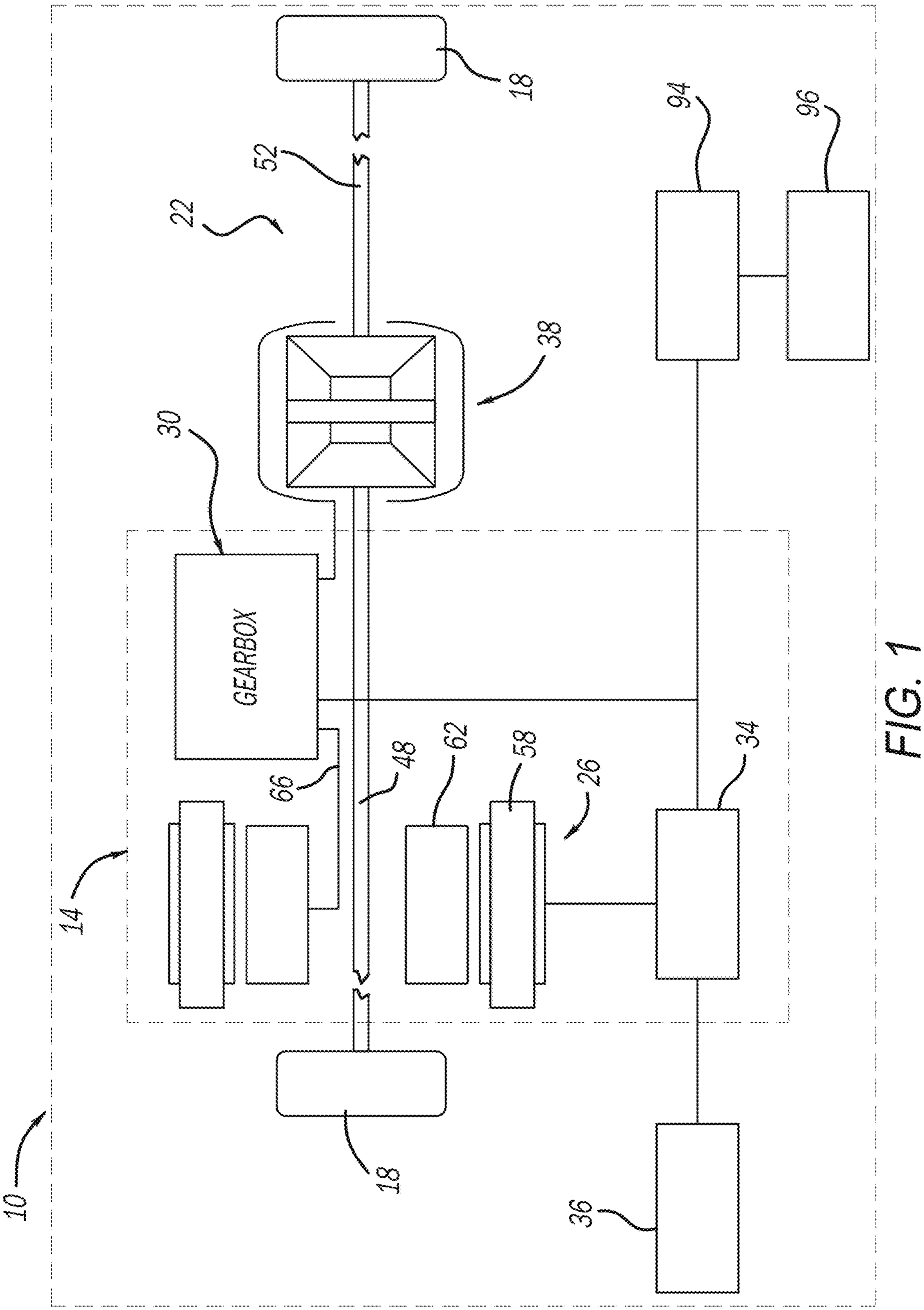
FIG. 1 is a schematic illustration of an example electric vehicle powertrain having a driveline/differential and an electric drive module with a two-speed gearbox assembly, in accordance with the principles of the present application.

With initial reference to FIG. 1, a vehicle 10 is partially shown in accordance with the principles of the present disclosure. In the example implementation illustrated, vehicle 10 includes an electric drive module (EDM) 14 configured to generate and transfer drive torque to wheels 18 via an axle or beam or one or more driveshafts or a driveline 22 for vehicle propulsion. The EDM 14 generally includes one or more electric drive units or motors 26 (e.g., electric traction motors), an electric drive gearbox assembly 30, and power electronics including a power inverter module (PIM) 34. The electric motor 26 is selectively connectable via the PIM 34 to a high voltage battery system 36 for powering at least the electric motor 26. The gearbox assembly 30 is configured to transfer the generated drive torque to the driveline 22 and can include a differential or the like 38 housed within a housing 42 of the EDM 14.

In one example implementation, the differential 38 can be external to the EDM housing 42 and separately incorporated into or with the driveline 22. Differential 38 can take the form of various types of differentials including an open differential or a locking differential such as an electrically or mechanically locking differential. The driveline 22 can include, such as in the example illustrated, a first or left axle shaft 48 and a second or right axle shaft 52. In the example shown, the EDM 14 is configured for use on a front axle of an electrified vehicle. It is appreciated, however, that the EDM 14 can be alternatively configured for use on a rear axle of an electrified vehicle. In other examples the EDM 14 can be provided on both of the front and rear axles for a four-wheel drive or all-wheel drive vehicle configuration.

In the example implementation illustrated, the electric motor 26 generally includes a stator 58, a rotor 62, and a rotor output shaft 66. The stator 58 is fixed (e.g., to housing 42) and the rotor 62 is configured to rotate relative to the stator 58 to drive the rotor shaft 66 and thus ultimately the vehicle axles 48, 52 (e.g., half shafts) and therefore drive wheels 18.

Figure 2:
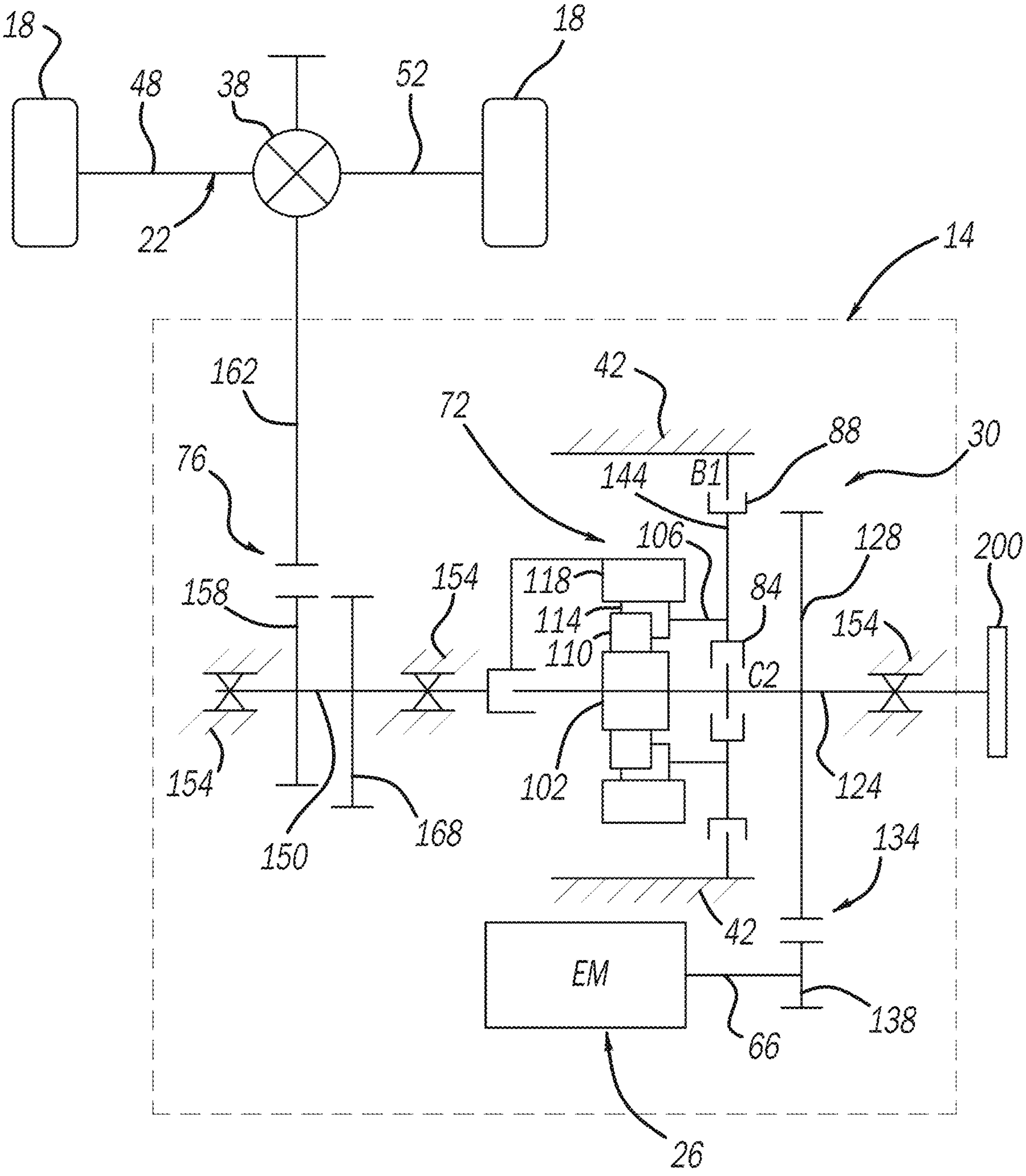
FIG. 2 is a schematic diagram of one example configuration of the two-speed gearbox assembly shown in FIG. 1, in accordance with the principles of the present application.

With reference now to FIG. 2 and continuing reference to FIG. 1, the two-speed gearbox assembly 30 will be described in greater detail. In the example implementation, the gearbox assembly 30 is coupled to the electric motor 26 through the rotor output shaft 66. Rotational output (torque) from the motor 26 is received via output shaft 66 by the gearbox assembly 30, which then transfers the rotational output through a final drive gearset and the differential 38 to the axles 48, 52 and wheels 18.

In the example implementation, the gearbox assembly 30 includes a planetary gearset 72, a final drive gearset 76, and first and second torque transfer devices 84, 88. In one example implementation, the gearbox assembly 30 includes only the one or single compound planetary gearset 72 and only the two torque transfer devices 84, 88. In this example implementation, the first torque transfer device 84 or C1 can be a controllable clutch and the second torque transfer device 88 or B1 can be a controllable brake configured to ground to the housing 42 or another suitable grounding structure. In the illustrated implementation, the clutch 84 and brake 88 can be hydraulically controlled or actuated or electronically controlled/actuated in connection with controller 94. Controller 94 can receive and process various vehicle inputs 96, such as a signal from an accelerator pedal of the vehicle. It will also be appreciated that the clutch and brake 84, 88 may be any suitable type of clutch, brake or torque transfer devices, including dog clutches, that enables gearbox assembly 30 to function as described herein. For example, B1 and C1 can be dog clutches for range shifting or friction type clutches for power shifting. Torque transfer device 84 can also be a single one way clutch.

In the example implementation, the compound planetary gearset 72 includes a sun gear 102, a single carrier 106, compound planet gears or planetaries or pinions 110, 114, and a ring or annulus gear 118. The single carrier 106 rotationally supports the compound or first and second planetaries 110, 114. The first planetary 110 is in meshing engagement with the sun gear 106 and the second planetary 114 is in meshing engagement with the ring gear 118. The first and second planetaries 110, 114 include 3 or more sets or pairs of planetaries 110, 114 and each set or pair is carried by the same shaft of carrier 106. Use of the compound planetaries provides for a more compact planetary gear set.

The first sun gear 102 is coupled for common rotation with an input shaft 124 to the EDM 14 and gearbox 30. Input shaft 124 is also fixedly connected to a first gear 128 of a first gear reduction set 134. First gear 128 is in meshing engagement with a second gear 138 of the first gear reduction set 134, and second gear 138 is fixedly connected to the output 66 of electric motor 26. The first gear reduction set 134 provides a first stage of fixed gear reduction. The compound planetary gearset 72 can provide a second stage of gear reduction for the EDM 14. As explained in greater detail herein, a power take off (PTO)_200 is coupled for rotation with and is driven by the input shaft 124.

The carrier 106 is fixedly coupled to a member 144 carrying at inner ends the clutch 84 and at outer ends the brake 88. The ring gear 118 is fixed to an output 150 of the gearbox 30 for common rotation therewith. The output 150 can be in the form of an output shaft and can, in one exemplary implementation, be rotatably supported by bearings 154. The output 150 is coupled to the final drive or third gear reduction set 76. In more detail, the third gear reduction set 76 include a first gear 158 fixed to output shaft 150 and in meshing engagement with a second gear 162, which is coupled to differential 38. This third gear reduction set 76 provides a third stage of fixed gear reduction.

In the example implementation illustrated, the EDM 14 input and output shafts 124, 150 are concentric. It will be appreciated however, that the input and output shafts 124, 150 can take on other arrangements, such as being offset from each other. In one example implementation, output shaft 150 can also include a park gear 168 associated therewith. In one example configuration, such as set forth in FIG. 2, an inner end of input shaft 124 on an opposite side as gear 128 can be supported by an adjacent end of concentric output shaft 150. This exemplary configuration can eliminate a need for another bearing to support the inner end of input shaft 124.

Using the EDM 14 to deliver drive torque from the electric motor 26, through the gearbox assembly 30, and to the drive wheels 18 will now be described in connection with operating modes of a first gear, a second gear and neutral. As used herein, "engage" or "activate" or "actuate" is used to mean closing a clutch or synchronizer or torque transfer device to transmit torque.

For the first gear operating mode, which results in a gear ratio multiplication greater than 1, the brake 88 is activated or engaged and the clutch 84 is deactivated or not engaged, such as by commands from controller 94. Grounding brake 88 to housing 42 grounds member 144 and carrier 106 fixed thereto. Torque from electric motor 26 flows via rotor 62 and output shaft 66 through the first reduction gear set 134 to connected sun gear 102 thereby rotationally driving sun gear 102. Sun gear 102 drives the compound planetary sets 110, 114 with carrier 106 being rotationally fixed by engaged brake 88. The compound planetary sets 110, 114 drive ring gear 118, which drives output shaft 150. Output shaft 150 drives axles 48, 52 via the third gear reduction stage and differential 38. First gear can be a "4LO" gear. First gear can, in one exemplary implementation, provide high torque multiplication capable of meeting off road trail, and/or heavy towing, and/or vehicle recovery, and/or vehicle towing torque requirements.

For the second gear operating mode, which results in a multiplication of 1, the clutch 84 is engaged and the brake clutch 88 is disengaged. In this scenario, member 144 rotates relative to housing 42 and is fixed for common rotation with input shaft 124 and sun gear 102 by engagement of clutch 84. This provides for essentially locking up the compound planetary gear set 72 resulting in a direct drive or 1:1 torque flow. Torque from electric motor 26 flows via rotor 62 and output shaft 66 through the first reduction gear set 134 to connected sun gear 102 thereby rotationally driving sun gear 102. Sun gear 102 is fixed for common rotation with carrier 106 via engaged clutch 84. Sun gear 102 drives the compound planetary sets 110, 114, which drive ring gear 118. Ring gear 118 drives output shaft 150. Output shaft 150 drives axles 48, 52 via the third gear reduction stage and differential 38. Second gear can be a "4HI" gear. Second gear can, in one exemplary implementation, provide torque and speed requirements for on-road driving.

The EDM 14 also includes and provides the functionality of operating in a neutral state or neutral PTO mode where the motor 26 is disconnected from the drive gears. The neutral state or operating mode is provided by controlling the clutch and brake 84, 88 to be in an open or disengaged state. The neutral state can be particularly useful for flat towing a vehicle having EDM 14. In examples, the EDM 14 drives the PTO 200 when operating in the neutral PTO mode. While the PTO 200 is shown generally directly coupled to the input shaft 124 it is contemplated that one or more intermediate gears or rotation transfer mechanisms (such as other gears, chains, sprockets, etc.) may be provided between the input shaft 124 and the PTO 200. In examples, the PTO 200 can be used to drive any auxiliary device such as, but not limited to, machinery, a generator, a winch, a boring tool, or any other machinery that uses a rotational input. It is contemplated that in some examples the PTO 200 would be incorporated on EDM's 14 used in range extender battery electric vehicles (BEV's) including heavy duty truck applications. In application, the EDM 14 therefore can provide the utility traditionally available on industrial or agricultural vehicles that would utilize a transfer box using a driven output from an internal combustion engine to run a given piece of machinery.

Described herein is an improved EDM 14 for an electrified vehicle that includes a two-speed gearbox utilizing only one or a single compound planetary gearset and only two torque transfer device, thereby providing for a very compact and less complex gearbox for the EDM that only requires one electric motor to meet on-road and off-road gearing drivability requirements. These features alone or in combination also provide for a more efficient gearbox with improved NVH that can switch between the two gears and neutral using only the two torque transfer devices. Further, the design of EDM 14 advantageously does not require individual electric drive modules for each wheel or complex controls/mechanisms.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

It will be appreciated that the term "controller" or "control system" (as well as "module" and "unit") as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or "commanding" or the like, refer to the action and processes of a computer system, or similar electronic computing device, that manipulates and transforms data represented as physical (electronic) quantities within the computer system memories or registers or other such information storage, transmission or display devices.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive module (EDM) for an electrified vehicle, the EDM having a housing, an electric motor and a two-speed gearbox assembly, the two-speed gearbox assembly comprising:

- one compound planetary gear set including a sun gear, a ring gear and a single planetary carrier having compound planetary gears each including a first gear in meshing engagement with the sun gear and a second gear in meshing engagement with the ring gear;
- an input shaft connected to the sun gear and coupled to an output of the electric motor;
- a power take off (PTO) driven by the input shaft;
- a first torque transfer device comprising a controllable clutch that selectively couples the carrier to the input shaft;
- a second torque transfer device configured for selectively coupling the carrier to the housing;
- wherein the ring gear is a fixed dedicated output of the two-speed gearbox assembly, which is coupled to a final drive of the electrified vehicle; and
- wherein the EDM is selectively switchable among (i) a first gear where the first torque transfer device is disengaged and the second torque transfer device is engaged grounding the carrier to the housing; (ii) a second gear where the second torque transfer device is disengaged and the first torque transfer device is engaged to couple for common rotation the carrier and the sun gear; and (iii) a neutral PTO mode wherein the first and second torque transfer devices are disengaged and the input shaft drives the PTO.

2. The EDM of claim 1, wherein first gear comprises a torque multiplication greater than one; and

- wherein second gear comprises a torque multiplication equal to one.

3. The EDM of claim 1, further comprising first and second fixed gear reduction gearsets, the first gear reduction gearset coupling the electric motor to the input shaft, and the second gear reduction gearset coupling the output of the two-speed gearbox assembly to a differential of the electrified vehicle.

4. The EDM of claim 1, wherein the first gear reduction gearset comprises first and second gears in meshing engagement, and wherein the sun gear is fixed for common rotation with the input shaft and the second gear of the first gear reduction gearset.

5. The EDM of claim 4, wherein the electric motor output is fixed for common rotation with the first gear of the first gear reduction gearset.

6. The EDM of claim 1, further comprising a park lock gear coupled to the output of the two-speed gearbox assembly upstream of the second fixed gear reduction gearset.

7. The EDM of claim 1, wherein the two-speed gearbox assembly is selectively switchable to a neutral state by controlling the first and second torque transfer devices to be disengaged or open.

8. The EDM of claim 1, wherein the second torque transfer device comprises a brake.

9. The EDM of claim 1, wherein the first and second torque transfer devices comprise dog clutches.

10. The EDM of claim 1, wherein the two-speed gearbox assembly comprises only the one compound planetary gearset and only the two torque transfer devices.

11. The EDM of claim 1, wherein the EDM comprises only one electric motor.

12. The EDM of claim 1, wherein the input shaft and the output of the two-speed gearbox assembly are concentric.

13. The EDM of claim 12, wherein an inner end of the input shaft is rotatable supported by an adjacent inner end of the output of the two-speed gearbox assembly.

14. An electrified vehicle, comprising:

- an electric drive module (EDM) including:
  - a housing;
  - an electric motor; and
  - a two-speed gearbox assembly comprising:
    - one compound planetary gear set including a sun gear, a ring gear and a single planetary carrier having compound planetary gears each including a first gear in meshing engagement with the sun gear and a second gear in meshing engagement with the ring gear;
    - an input shaft connected to the sun gear and coupled to an output of the electric motor;
    - a power take off (PTO) driven by the input shaft;
    - a first torque transfer device comprising a controllable clutch that is controlled to selectively couple the carrier to the input shaft;

a second torque transfer device configured for selectively coupling the carrier to the housing;

wherein the ring gear ring gear is a fixed dedicated output of the gearbox assembly, which is coupled to a final drive of the electrified vehicle; and wherein the EDM is selectively switchable among (i) a first gear where the first torque transfer device is disengaged and the second torque transfer device is engaged grounding the carrier to the housing; (ii) a second gear where the second torque transfer device is disengaged and the first torque transfer device is engaged to couple for common rotation the carrier and the sun gear; and (iii) a neutral PTO mode wherein the first and second torque transfer devices are disengaged and the input shaft drives the PTO.

15. The electrified vehicle of claim 14, wherein first gear comprises a torque multiplication greater than one; and wherein second gear comprises a torque multiplication equal to one.

16. The electrified vehicle of claim 14, further comprising first and second fixed gear reduction gearsets, the first gear reduction gearset coupling the electric motor to the input shaft, and the second gear reduction gearset coupling the output of the two-speed gearbox assembly to a differential of the electrified vehicle;

wherein the first gear reduction gearset comprises first and second gears in meshing engagement;

wherein the sun gear is fixed for common rotation with the input shaft and the second gear of the first gear reduction gearset; and wherein the electric motor output is fixed for common rotation with the first gear of the first gear reduction gearset.

17. The electrified vehicle of claim 14, wherein the two-speed gearbox assembly is selectively switchable to a neutral state by controlling the first and second torque transfer devices to be disengaged or open.

18. The electrified vehicle of claim 14, wherein the second torque transfer device comprises a brake.

19. The electrified vehicle of claim 14, wherein the two-speed gearbox assembly comprises only the one compound planetary gearset, only the two torque transfer devices, and only one electric motor.

20. The electrified vehicle of claim 14, wherein the input shaft and the output of the two-speed gearbox assembly are concentric; and wherein an inner end of the input shaft is rotatable supported by an adjacent inner end of the output of the two-speed gearbox assembly.

* * * * *